(12) United States Patent
Skauen

(10) Patent No.: US 7,359,166 B2
(45) Date of Patent: Apr. 15, 2008

(54) METHOD AND CONTROL SYSTEM FOR CONTROLLING ELECTRIC MOTORS

(75) Inventor: Ronny Skauen, Gressvik (NO)

(73) Assignee: Sleipner Motor AS, Fredrikstad (NO)

( * ) Notice: Subject to any disclaimer, the term of this patent is extended or adjusted under 35 U.S.C. 154(b) by 493 days.

(21) Appl. No.: 10/618,265

(22) Filed: Jul. 11, 2003

(65) Prior Publication Data

US 2004/0085695 A1 May 6, 2004

(30) Foreign Application Priority Data

Oct. 30, 2002 (NO) ................................ 2002 5207

(51) Int. Cl.
*H02H 7/08* (2006.01)
(52) U.S. Cl. ...................................... 361/23
(58) Field of Classification Search .................. 361/33, 361/23
See application file for complete search history.

(56) References Cited

U.S. PATENT DOCUMENTS

| | | | | |
|---|---|---|---|---|
| 3,656,023 | A * | 4/1972 | Hadfield | 361/26 |
| 3,671,834 | A * | 6/1972 | Buckeridge | 318/293 |
| 3,898,527 | A * | 8/1975 | Cawley | 361/23 |
| 3,911,341 | A * | 10/1975 | Carlson et al. | 388/829 |
| 4,027,202 | A * | 5/1977 | Tyler et al. | 361/33 |
| 4,151,575 | A * | 4/1979 | Hogue | 361/33 |
| 4,389,692 | A * | 6/1983 | Sander et al. | 361/29 |
| 4,477,753 | A * | 10/1984 | Ratzel et al. | 318/563 |
| 4,638,850 | A * | 1/1987 | Newell et al. | 165/255 |
| 4,942,346 | A | 7/1990 | Ardit et al. | |
| 4,972,133 | A * | 11/1990 | Hirota et al. | 318/646 |
| 5,128,500 | A * | 7/1992 | Hirschfeld | 200/5 R |
| 5,189,412 | A * | 2/1993 | Mehta et al. | 340/825.22 |
| 5,661,625 | A * | 8/1997 | Yang | 361/92 |
| 6,169,648 | B1 * | 1/2001 | Denvir et al. | 361/25 |
| 6,234,100 | B1 * | 5/2001 | Fadeley et al. | 114/144 R |
| 6,570,272 | B2 * | 5/2003 | Dickhoff | 307/113 |

(Continued)

FOREIGN PATENT DOCUMENTS

EP 0 651 489 5/1995

(Continued)

*Primary Examiner*—Michael Sherry
*Assistant Examiner*—Ann T. Hoang
(74) *Attorney, Agent, or Firm*—Lipsitz & McAllister LLC

(57) ABSTRACT

There is described a method for controlling an electric motor comprising an operating relay having relay windings with respective first and second relay contacts and a control means, which motor via current conductors is connected to said relay and a power source wherein an operator by using said control means controls the application of current to the motor armature or rotor and field coil(s) or field magnet(s), monitoring devices are provided which sense indicating parameters that are compared with respective corresponding reference values in a safety function unit in order to determine whether the contacts of the operating relay are mistakenly in the on position, and if one of the contacts is the on position, ensures the switching on of at least the other one of the relay contacts so that the current application to the motor is interrupted and the motor stops. There is also described a control system for an electric motor, wherein sensors/sensing means are provided arranged at suitable measuring points in the system or motor circuit connected to the safety function unit and arranged so that when there is no control signal to the relays, the contacts of both relays are energized and the motor stops.

4 Claims, 3 Drawing Sheets

U.S. PATENT DOCUMENTS 6,657,833 B2 * 12/2003 Matsuki et al. ............... 361/23

FOREIGN PATENT DOCUMENTS

| | | |
|---|---|---|
| GB | 1 523 599 | 9/1978 |
| JP | 2216726 | 8/1990 |
| JP | 5049314 | 3/1993 |
| JP | 10145909 | 5/1998 |

* cited by examiner

METHOD AND CONTROL SYSTEM FOR CONTROLLING ELECTRIC MOTORS

BACKGROUND OF THE INVENTION

The invention relates to a method and control system for controlling electric motors, especially motors carrying relatively strong current. Such motors are widely used for the operation of ship thrusters where it is also particularly important to assure reliable operation.

Normally, direct-current motors are used, and the current to both the motor rotor or armature and the field coils or field magnets is connected via an operating relay. The operation and the direction of rotation of the motor is controlled by means of a joystick or the like that is connected to a power source such as a battery and via the operating relay provides the desired power supply to the motor.

One problem that may arise is that the operating relay or the main relay of the motor becomes locked in the on position, usually as a consequence of low voltage and subsequent relay failure and/or strong current, but also for other reasons. The motor will then rotate uncontrollably until the main power switch of the operating system is switched off. This will easily take some second or minutes for an unskilled or inexperienced user or skipper. If the motor operates a thruster which pushes the boat to port or to starboard in narrow stretches or water, the consequence may be personal injury and material damage.

The object of the invention is to provide a method for controlling electric motors and a control system for electric motors which intend to eliminate the problems of the aforementioned type.

BRIEF SUMMARY OF THE INVENTION

According to the invention there is provided a method for controlling an electric motor comprising an operating relay having relay windings with respective first and second relay contacts and a control means, which motor via current conductors is connected to the relay and a power source wherein an operator by using the control means controls the application of current to the motor armature or rotor and field coil(s) or field magnet(s), and the invention is characterised in that monitoring devices are provided which sense indicating parameters that are compared with respective corresponding reference values in a safety function unit in order to determine whether the contacts of the operating relay are mistakenly in the on position, and if one of the contacts is the on position, ensures the switching on of at least the other one of the relay contacts so that the current application to the motor is interrupted and the motor stops.

In one embodiment of the invention, a voltage is sensed which is indicative of the voltage at the relay winding, which voltage is compared with a reference voltage and if the voltage is found to be too low in relation to a threshold value at which the relays do not fail, but are close to doing so, the power supply to the relevant relay winding is cut off, and a delay device is activated which, prior to reapplication of approved voltage to the relevant relay winding after an interruption because of excessively low voltage, will be effected at a lower frequency than without the delay device.

According to the invention there is also provided a method for controlling an electric motor comprising an operating relay having relay windings with respective first and second relay contacts, a control means, which motor via current conductors is connected to the relay and a power source, wherein an operator by using the control means controls the application of current to the motor armature or rotor and field coil(s) or field magnet(s), which method is characterised in that a voltage is sensed which is indicative of the voltage at the relay winding, which voltage is compared with a reference voltage and if the voltage is found to be too low in relation to a threshold value at which the relay does not fail, but is close to doing so, the power supply to the relevant relay winding is cut off, and a delay device is activated which, prior to reapplication of approved voltage to the relevant relay winding after an interruption because of excessively low voltage, will be effected at a lower frequency than without the delay device.

According to the invention there is also provided a control system for an electric motor, comprising an operating relay having relay windings with respective relay contacts, a control means, which motor via current conductors is connected to the relay and a power source, wherein an operator by using the control unit controls the application of current to the motor armature or rotor and field coil(s) or field magnet(s) in such manner that the operation of the motor is controlled, characterised in that the system further comprises a safety function unit and there are provided sensors/sensing means arranged at suitable measuring points in the system or motor circuit connected to the unit and arranged so that when there is no control signal to the relays, the contacts of both relays are energised and the motor stops.

In one aspect of the invention, the control system is characterised in that the safety function unit is provided with terminals which via wires are connected to the control unit, wires are connected to one side of the respective relay windings, so that the voltage at the windings can be sensed and given as a signal to the connected terminals on the unit, whose opposite sides are connected via wire to the power source, and terminals are connected to, in the open position of the relay, non-energised relay contacts, or other suitable measuring points in the system or motor circuit, for example, at the transition between the armature and the field coil(s) so that it can be sensed whether the relay contacts are in an on position (energised), wherein the sensed value can be compared with a reference value, and the sensed position is given as a signal to the terminals, and the signals from the respective relay contacts and the relay windings are compared in the unit, and a device is provided in the unit which in the event of a discrepancy between the respective compared signals immediately applies an operating signal to the opposite side of the relevant relay winding, so that the electric circuit is broken and the motor stops.

In another aspect of the invention, the control system is characterised in that the unit further comprises a terminal which via a wire is connected to a wire connected to a junction between two relay windings or the input voltage to the motor or control system, so that the voltage at this point can be sensed and given as a signal to the terminal, and in the unit there is provided a device which determines whether the sensed voltage is too low in relation to a predetermined threshold value at which the relays do not fail, but are close to doing so, and a suitable delay device that is activated prior to each application of voltage to the opposite side of the relevant relay winding so that in the event of relay failure, the application of voltage will be effected at a lower frequency than without the delay device.

In a further aspect of the invention, is the control system characterised in that the safety function unit is equipped with terminals which via wires are connected to the control unit, and a terminal which via a wire is connected to a conductor or wire connected in a junction between two opposite relay windings or another suitable measuring point in the system or motor circuit, so that the voltage at this point can be sensed and given as a signal to the terminal, and in the unit there is provided a device which determines whether the sensed voltage is too low in relation to a predetermined threshold value, and a suitable delay device which is activated prior to each application of voltage to the opposite side of the relevant relay winding so that in the event of relay failure, the application of voltage will be effected at a lower frequency than without the delay device.

In still another aspect of the invention is the control system characterised in that the control unit comprises one or more of joystick, touch panel, buttons, radio signal receiver, automatic control with suitable intelligence and/or switches.

In a still further aspect of the invention is the control system characterised in that the sensors or sensing devices comprise microswitches and/or other suitable measuring devices or detectors.

In still another aspect of the invention is the control system characterised in that there is provided a thermoswitch connected between the motor armature and the safety function unit.

DETAILED DESCRIPTION OF THE INVENTION

Figure 1:
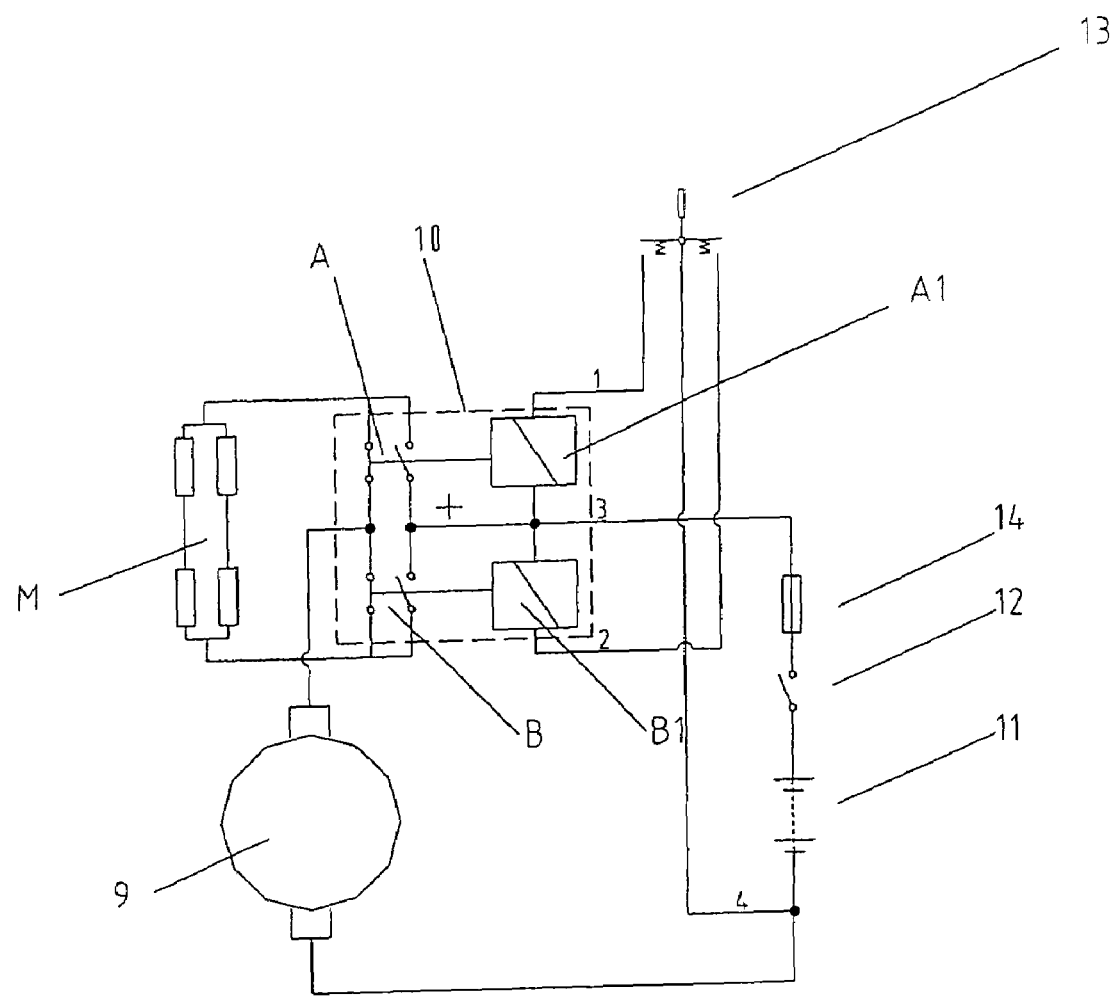
FIG. 1 illustrates a standard circuit connection or a control system for an electric motor.

FIG. 1 indicates, inter alia, an electric motor comprising a rotor or armature 9 and field coils or field magnets M. The motor is a direct-current motor whose rotor 9 and field magnet or magnets M are connected via an operating relay 10, a control means 13, which in the illustrated case consists of a joystick with spring return, wires, a safety fuse 14 and a switch 12, to a power source 11, in the illustrated case a battery. The operating relay 10 is of a type that comprises a first relay winding A1 and a second relay winding B1, each comprising two respective relay contacts A and B respectively. In the drawing, the circuit connection is shown when non-energised or in so-called open position. The centre position or neutral position of the joystick 13 and one of the poles of the armature 9 are connected to the negative terminal of the battery 11. After the battery switch 12 has been switched on, the circuit is ready for operation. When the joystick 13 is moved across to the left of the figure, contact is made between a wire 4 and a wire 1 in the first relay winding A1 so that a circuit is formed through the winding to the wire 3 and via the safety fuse 14 and the switch 12 to the positive terminal of the battery 1, and the relay winding is energised so that one of the relay contacts A is opened or broken and the other is closed or made. For the sake of simplicity, the direction of current is defined as a positive to negative direction. Thus, the current flows through the field coils or field magnets M, then through the closed relay contact B and the armature 9 and back to the negative terminal of the battery 11. If the joystick 13 is shifted to the right in the figure, the current is connected through the relay winding B1 so that the relay contacts are opened and closed respectively via the closed contact to the opposite side of the field coils or field magnets M, according to the sequence described above, through the now closed relay contact A and to the armature 9. Since the field magnets are now excited in the opposite direction, the motor will rotate in the opposite direction.

It is this standard connection that is particularly vulnerable, as the relay 10 can become locked in the on or energised position as described above, with the problems that this might entail.

Figure 2:
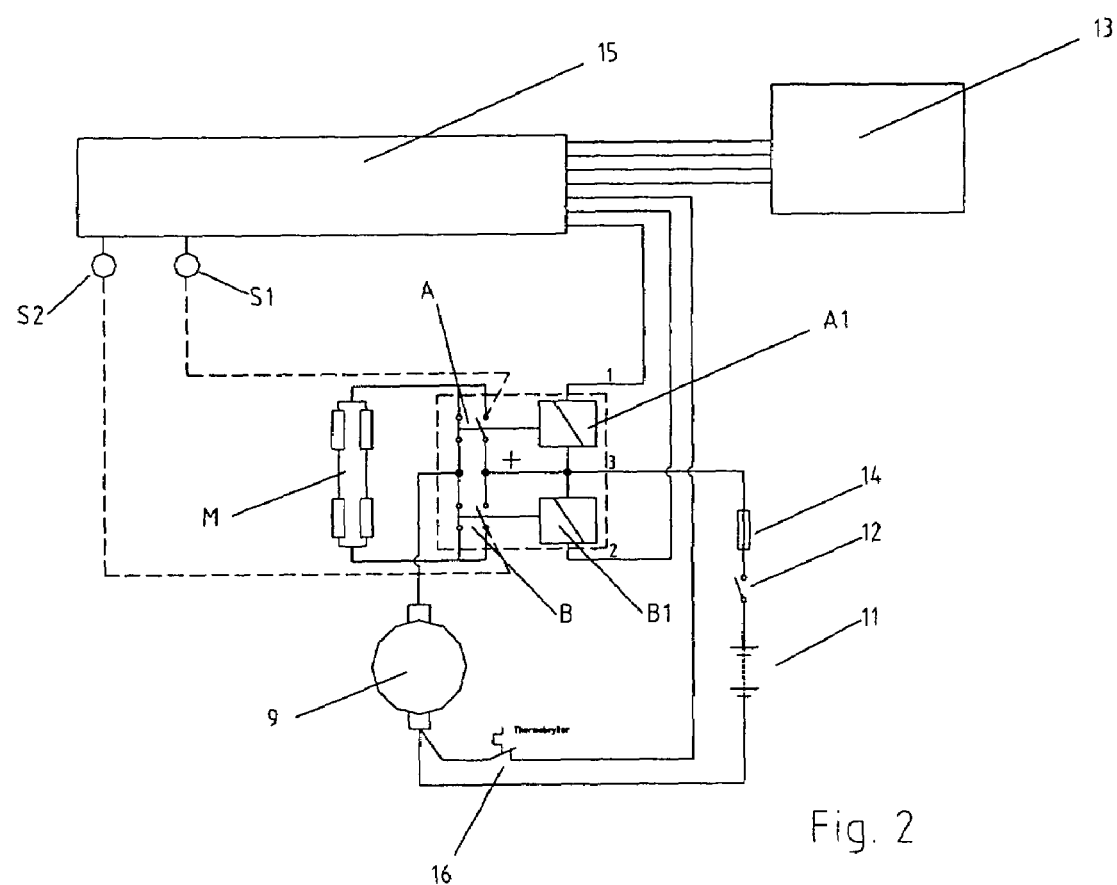
FIG. 2 illustrates a first embodiment of the control system according to the invention.

FIG. 2 shows a circuit connection or control system which for the most part is similar to the connection in FIG. 1, but which has been modified so that a far more reliable operation is provided according to the invention. In one embodiment of the invention there is incorporated a safety function unit 15 which is provided with terminals for connection to the control means 13, the relay windings A1 and B1, optionally a thermoswitch 16 connected to the motor armature 9 or simply arranged internally in the motor and provides controlling current or displacement voltage to the control system, and two terminals S1 and S2 which via indicated broken lines are connected to the open, non-energised relay contacts A and B respectively or another suitable point in the motor which has a varying voltage or current depending on operation or non-operation of the motor.

The control means 13 may comprise one or more of a number of operating devices such as a joystick, a touch panel, buttons and/or switches, to provide corresponding current control to the motor and the operating relay 10 as described above.

A signal or signals, sensed by a suitable method if operating relay 10 contacts A and B are in the on position (energised), is or are applied via the terminals S1 and S2 on the unit 15. This applied signal is compared with the voltage at the respective relay windings A1 and B1, i.e., the control signal at the magnet coils of the relay. On position is only accepted by the unit 15 or the control system when the respective relay contact A or B and magnet winding A1 or B1 also have voltage applied thereto.

What is meant by a suitable method for determining whether the operating relay contacts are in the on position (energised) is, for example, that voltages are measured and compared, the drawing of current is measured, the Hall effect is measured, the rotational speed of the motor is measured, frequencies in cables are measured or the actual mechanical position of the relay contacts is determined using a switch or another sensor etc. All these options and possibly other options for determining whether the operating relay contacts are energised are within the scope of the invention and represent technically obvious options or alternatives.

If a move is made to cut off the applied voltage, this means that the user or skipper no longer wishes to operate the motor or thruster. In the unit 15 an examination or check is then made to see whether the respective relay contact A or B is also in the open position. If this is not the case, the unit 15 ensures that an operating signal is applied immediately to the opposite side of the relay or magnet winding A1 or B1 or to both sides simultaneously, and this action of the safety function unit 15 causes the electric circuit to be broken and the motor 9 to be stopped, However, it is clear that the monitoring or checking in the unit 15, as mentioned above, should possibly also be carried out continuously during operation, or should only be carried out in a limited period of time after the intended cutting-out of the motor. Both possibilities are within the scope of the invention and represent technically obvious options or alternatives.

Figure 3:
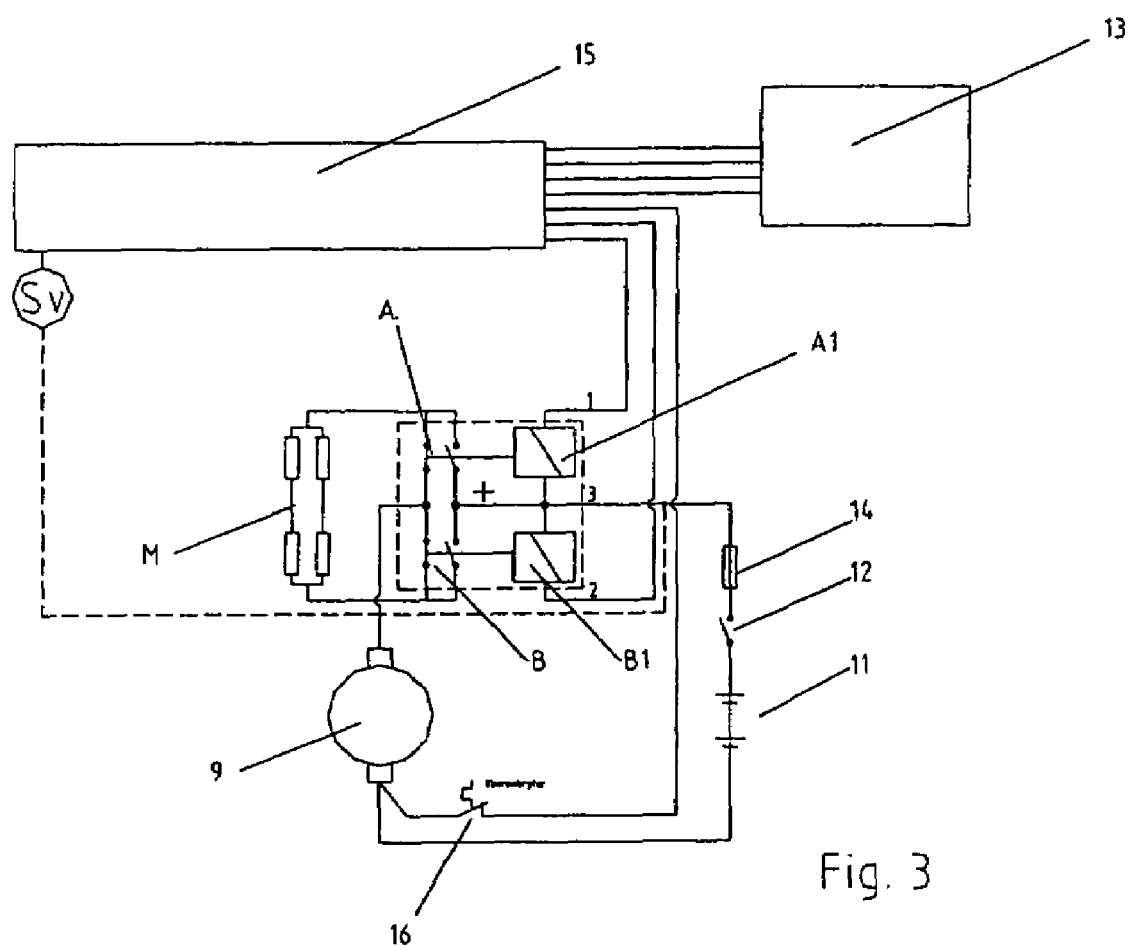
FIG. 3 illustrates a second embodiment of the control system according to the invention.

FIG. 3 shows another variant of the control system according to the invention which comprises safety functions for monitoring the voltage to the motor 9. For the sake of clarity, the system in FIG. 3 is shown and described as a separate system, although it could have been incorporated into the system in FIG. 2.

Unlike FIG. 2, FIG. 3 shows the safety function unit 15 equipped with a terminal SV which via a wire indicated in a broken line is connected to the wire 3 between the relay windings.

The problem on which this variant of the invention is based is that at low supply voltage, the relays A and B could fail with a subsequent risk of burning and uncontrollable operation of the electric motor and thruster. The reason for the burning of the contacts at low voltage is that even at low output voltage (battery voltage), the thruster motor will draw substantial amounts of current. This current will lead to a voltage drop in cables or wires and the battery when the motor is running. If the output voltage is too low, this will cause the relays to fail. When the relays fail, the voltage to the motor will be cut off and the voltage rises again to its starting-up point. This is repeated at a frequency which, because of the arc formation, quickly results in overheating and melting of the contacts on the operating relay of the motor. The relay contacts A or B might then become locked in the on position.

One solution to this problem may be to ensure that the relay cannot cut in and out as mentioned above at a fairly high frequency. According to the invention, this is ensured in that the control system monitors the voltage applied to the relay coils A1 and B1 and if the voltage is too low, the power supply to the relay windings of the operating relay is cut, whereupon a delay device is activated before the next feed or application of voltage to the same or to the opposite side of the relay windings A1 and B1 once the voltage is above the threshold value again. The operator or the skipper or user will then register that the voltage is too low in that the thruster performs with a distinct low-frequency pulsating output. The contacts of the operating relay are thus not damaged because of the low frequency and the thus limited heating of the contact faces, and necessary measures can be taken before greater damage is done.

The application of voltage to the operating relay coils will not be fed to a relay winding if the voltage is measured to be below the threshold value.

Although specific embodiments and aspects of the invention are described above, it is clear that the application could be realised in a number of ways without departing from the fundamental principles thereof. These and equivalents of these are intended to be within the scope of the invention.

The function that the control system in fact provides is to reduce the possibility of damage to the relay contact faces caused by low voltage during operation, and that in the event that the relay is nevertheless in the energised, operational position without the user or skipper having given a signal for this, that the system, on the application of current to one or both of the relay windings A1 and B1, ensures that the relay contacts A and B are put in the same position, i.e., the on position at the same time in order to stop the motor because the circuit is broken when both relay contacts are in the same position.

What is claimed is:

1. A method for the safety management of a boat thruster control system, said thruster control system controlling an electric thruster motor for a thruster, said motor connected via an operating relay to a supply voltage source, said thruster control system comprising:

a manually operated control means for commanding the motor to drive the thruster to selectively move the boat in a port direction or a starboard direction;

said manually operated control means providing one of a first control signal or a second control signal respectively representing one of said port direction or said starboard direction;

said first and said second control signals controlling said operating relay having first and second relay windings, and actuating first and second relay contacts making said motor run in a first or second direction respectively;

said method comprising:
   monitoring a supply voltage from said supply voltage source;

continuously monitoring a state of said first and second relay contacts;

delaying a re-excitation of said first or second relay windings after a break if said monitored supply voltage is too low to maintain said relay in a stable pick-up state in order to avoid chattering and burning of said relay contacts;

continuously comparing said control signals with signals representing the state of said first and second relay contacts to determine whether one of said first or second relay contacts is erroneously activated to run the motor either in said first or second direction;

if one of said first or second relay contacts is erroneously activated, actuating the other of said first or second relay contacts to supply the same;

voltage level to both terminals of the motor, thereby interrupting the current to the motor; and if the control signal indicates that only the erroneously activated relay contact should be activated, the other of relay contacts is released, thereby running the motor in the direction corresponding to the erroneously activated relay contact.

2. The system of claim 1, wherein said control means comprises one or more of a joystick, a touch panel, push buttons, and a radio signal receiver.

3. A safety control device for a boat thruster control system, said thruster control system for controlling an electric thruster motor for a thruster, said motor connected via an operating relay to a supply voltage source, said thruster control system comprising:

a manually operated control means for commanding the motor to drive the thruster to selectively move the boat in a port direction or a starboard direction;

said manually operated control means providing one of a first control signal or a second control signal respectively representing one of said port direction or said starboard direction;

said first and said second control signals controlling said operating relay having first and second relay windings for actuating first and second relay contacts for making said motor run in a first or second direction respectively, said safety control device comprises;
   a first monitoring device for monitoring a supply voltage from said supply voltage source;

one or more second monitoring devices for continuously monitoring a state of said first and second relay contacts;

said safety control device adapted for delaying a re-excitation of said first or second relay windings after a break if said monitored voltage from said first monitoring device is too low to maintain said relay in a stable pick-up state in order to avoid chattering and burning of said relay contacts;

said safety control device further adapted for continuously comparing said control signals with signals from said one or more second monitoring devices to determine whether one of said first or second relay contacts is erroneously activated to run the motor either in said first or second direction, and, if one of said first or second relay contacts is erroneously activated, actuating the other of said first or second relay contacts to supply the same voltage level to both terminals of the motor, thereby interrupting the current to the motor; and if the control signal indicates that only the erroneously activated relay contact should be activated, the other of relay contacts is released, thereby running the motor in the direction corresponding to the erroneously activated relay contact.

4. The system of claim 3, wherein said control means comprises one or more of a joystick, a touch panel, push buttons, and a radio signal receiver.

* * * * *